United States Patent [19]
Denis et al.

[11] Patent Number: 5,511,382
[45] Date of Patent: Apr. 30, 1996

[54] PROCESS AND INSTALLATION FOR THE CRYOGENIC PURIFICATION OF HYDROGEN

[75] Inventors: Catherine Denis, Champigny Sur Marne; Pierre Gauthier, Fresnes; Jean-Claude Villard, Echirolles, all of France

[73] Assignee: L'Air Liquide, Societe Anonyme Pour L'Etude et L'Exploitation des Procedes Georges Claude, Paris, France

[21] Appl. No.: 322,444

[22] Filed: Oct. 18, 1994

[30] Foreign Application Priority Data

Oct. 26, 1993 [FR] France .................... 93 12730

[51] Int. Cl.⁶ .................................................. F25J 3/00
[52] U.S. Cl. ............................. 62/619; 62/910; 62/932
[58] Field of Search ........................................ 62/24, 38

[56] References Cited

U.S. PATENT DOCUMENTS

| | | | |
|---|---|---|---|
| 3,038,318 | 6/1962 | Hänny | 62/38 X |
| 3,105,631 | 10/1963 | Hänny | 62/38 X |
| 3,363,428 | 1/1968 | Charlesworth | 62/38 X |
| 3,553,972 | 1/1971 | Markbreiter et al. | 62/38 X |
| 4,217,759 | 8/1980 | Shenoy | 62/38 X |
| 4,578,952 | 4/1986 | Gauthier | 60/649 |
| 4,619,679 | 10/1986 | De Long | 62/38 X |
| 4,666,483 | 5/1987 | Gauthier | 62/38 X |

FOREIGN PATENT DOCUMENTS

| | | |
|---|---|---|
| 1457243 | 9/1966 | France . |
| 1546283 | 11/1984 | France . |
| 1304568 | 1/1973 | United Kingdom . |

Primary Examiner—Christopher Kilner
Attorney, Agent, or Firm—Young & Thompson

[57] ABSTRACT

A process and installation for the cryogenic purification of impure hydrogen, of the type in which impure hydrogen is cooled under a low pressure PO to a temperature sufficiently low to condense a predetermined proportion of the impurities, by heat exchange in a thermal heat exchange line (3) with purified hydrogen and with a residual fraction containing the expanded preliminarily condensed impurities (in 11, 12) to a low pressure P1. The remaining cold is supplied by the expansion of purified hydrogen in a turbine (8) with gas bearings and the expanded hydrogen is added to the light impurities expanded at the cold end of the heat exchange line. The turbine (8) is supplied with the gas leaving its bearings (17), after cooling of hydrogen at the labyrinthine seal (18) of the turbine is withdrawn under a pressure slightly less than the interstitial pressure Pi which prevails between the rotor (14) and the stator (16) of this turbine.

12 Claims, 2 Drawing Sheets

PROCESS AND INSTALLATION FOR THE CRYOGENIC PURIFICATION OF HYDROGEN

FIELD OF THE INVENTION

The present invention relates to a process for the cryogenic purification of impure hydrogen, of the type in which the impure hydrogen is cooled under a high pressure PO to a sufficiently low temperature to condense a predetermined proportion of the impurities, by heat exchange in a heat exchange line with purified hydrogen and with a residual fraction containing the condensed impurities first expanded to a low pressure P1, the balance of the refrigeration being supplied by expansion of purified hydrogen in a turbine with gas bearings and the expanded hydrogen being added to the expanded light impurities at the cold end of the heat exchange line.

The pressures involved hereinafter are absolute pressures.

BACKGROUND OF THE INVENTION

Environmental protection standards require increasingly lower residual sulfur contents in combustibles and fuels, creating a supplemental need for hydrogen and requiring an increase in the treatment capacity of existing reactors for the hydrodesulfurization of hydrocarbons (for example of gasoline).

One of the solutions is to increase the partial pressure of hydrogen by purifying the hydrogen from conventional sources, particularly that from catalytic reformers.

The purification by cryogenic means, compared to other processes, is economically interesting when the capacity to purify hydrogen is great and is characterized by a final hydrogen purity of about 98 mol %, a high recovery output, about 96%, and a low energy consumption.

The cold requirement of this type of process is essentially ensured by the free expansion of impurities, principally constituted by hydrocarbons. For a catalytic reforming gas, whose composition conventionally is

| | |
|---|---|
| H2 | 84 mol % |
| CH4 | 6 mol % |
| C2H6 | 5 mol % |
| C3H8 | 3 mol % |
| C4H10 | 2 mol % | the methane content is insufficient to ensure by free expansion the refrigeration power necessary for the coldest portion of the heat exchange line, and an expansion turbine of low power must therefore be provided to supply the necessary supplement.

Given the low power generated by the expansion of a small hydrogen flow of high purity whose molecular weight is about 2 kg/kmole, the use of turbines with gas bearings, permitting very high rotation speeds, is particularly advantageous.

The operation of turbines with gas bearings implies the use of so-called "utility gases", taken from the flow of purified hydrogen, to ensure the two conventional functions as follows:

on the one hand, a low flow at ambient temperature, so-called seal gas, is injected within the labyrinthine seal, provided between the rotor and the bearings, at a pressure slightly less than the interstitial pressure generated behind the turbine rotor by the escape between the rotor and the stator of gas to be expanded. This seal gas limits the flow rate of cold loss and reheats it before its mixture flows to the bearings sustaining the rotor;

on the other hand, a larger flow rate at ambient temperature, called bearing gases, is injected within the support bearings, where it is subjected to a generally sonic expansion.

The utility gases are then collected and sent to the residual gas network of the installation.

The invention has for its object to provide a process leading to important valorization of the gas utilized, and an increased output of the process with minimum loss of purified hydrogen.

To this end, the invention has for its object a process of the type recited above, characterized in that the turbine is supplied with gas leaving the bearings, after cooling this gas in the heat exchange line, and there is withdrawn a flow rate of hydrogen leak at the level of the labyrinthine seal of the turbine, under a pressure slightly less than the interstitial pressure Pi which prevails between the rotor and the stator of this turbine.

The process can comprise one or several of the following characteristics:

the supply of the turbine is completed by a flow of purified hydrogen expanded in an expansion valve;

the leakage flow is added, if desired after expansion in an expansion valve, to the residual gas at ambient temperature;

the leakage flow is added, after cooling and if desired expansion, to said expanded residual fraction.

The invention also has for its object an installation adapted to practice the process defined above. This installation, of the type comprising a heat exchange line, at least one phase separator at the cold end of this heat exchange line, a hydrogen expansion turbine with gas bearings, means to cause to circulate a current of impure hydrogen in one direction in the heat exchange line, means to expand to a low pressure the liquid phase from the phase separator, means to add hydrogen under low pressure to the residual fraction resulting from this expansion, and means to cause to circulate the mixture obtained under the low pressure in countercurrent with the impure hydrogen, is characterized in that the heat exchange line comprises cooling passages for the gas leaving the turbine bearings, these passages being connected to the input of the turbine at the cold end of the heat exchange line, the installation comprising means to withdraw a leakage flow of hydrogen from the labyrinthine seal of the turbine, under a pressure slightly less than the interstitial pressure P*I* which prevails between the rotor and the stator of this turbine.

BRIEF DESCRIPTION OF THE DRAWINGS

An example of the practice of the invention will now be described with regard to the accompanying drawings, in which.

DETAILED DESCRIPTION OF THE INVENTION

Figure 1:
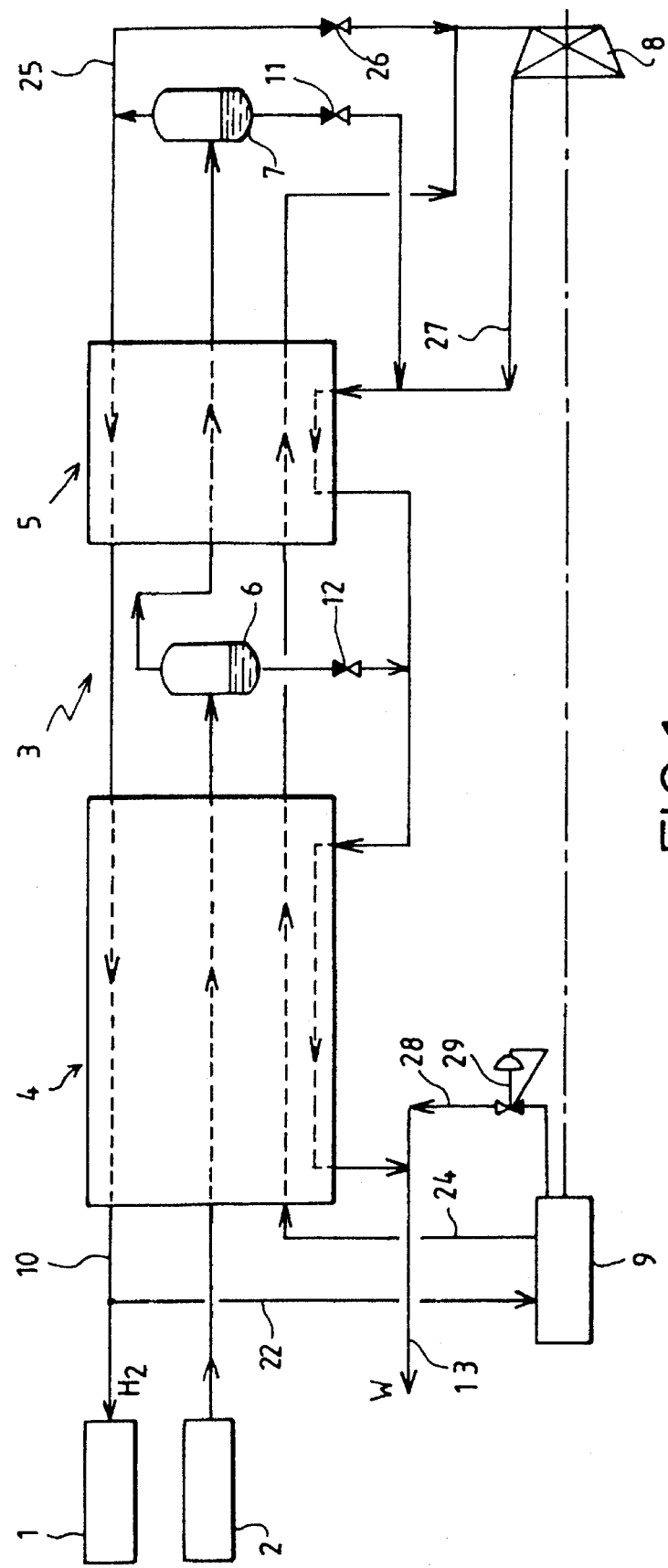
FIG. 1 shows schematically an impure hydrogen purification installation according to the invention.

The installation shown in FIG. 1 is adapted to supply to a hydrogen desulfurization reactor 1 relatively pure hydrogen, typically at a purity of the order of 96 to 98%, under a high pressure PO of the order of 50 bars. To do this, the installation is supplied with impure hydrogen from a catalytic reformer 2 and having typically the composition indicated above. It is this gas which constitutes the impure hydrogen to be purified by cryogenic means.

The invention comprises essentially a heat exchange line 3, of the indirect countercurrent heat exchange type, which comprises a warm portion 4 and a cold portion 5, a "hot" phase separator 6, a "cold" separator 7, and a turbine 8 with gas bearings. For clarity of illustration, there is separately schematically shown at 9 in FIG. 1 the assembly of the devices of the turbine using utility gas (labyrinthine seal and bearings).

The impure hydrogen, leaving the apparatus 2 under the production pressure PO (less pressure drop), is cooled to an intermediate temperature in 4, then sent to the phase separator 6, in which all of the impurities other than methane substantially completely condense. The vapor phase from this separator continues its cooling in 5 to the cold end of the heat exchange line, then is sent to the phase separator 7. The vapor phase from this latter is almost entirely reheated in 5 then in 4, and leaves from the warm end of the heat exchange line, via a conduit 10, as purified hydrogen product.

Most of the necessary cold is obtained by expanding to a low pressure P1 in an expansion valve 11 the liquid phase from the separator 7, by vaporizing it at 5, by recombining it with the liquid phase from the separator 6 previously expanded at P1 in an expansion valve 12, and by vaporizing and reheating it in 4. The resulting flow is evacuated from the warm end of the heat exchange line, as residual gas W of the installation, via a conduit 13, and this gas is at a sufficient pressure, for example of the order of 3 to 4 bars, to be distributed in the gas network for heating the site (so-called "fuel gas" network).

Because of the low content of methane of the impure hydrogen, this is not enough to ensure the maintenance of cold in the cold portion of the installation. Auxiliary cold is therefore supplied by the turbine 8, whose output, at the low pressure P1 of 3 to 4 bars, is injected into the fluid leaving the expansion valve 11, at the cold end of the heat exchange line, to reduce the temperature of this cold end and therefore to augment the degree of purity of the hydrogen product.

Figure 2:
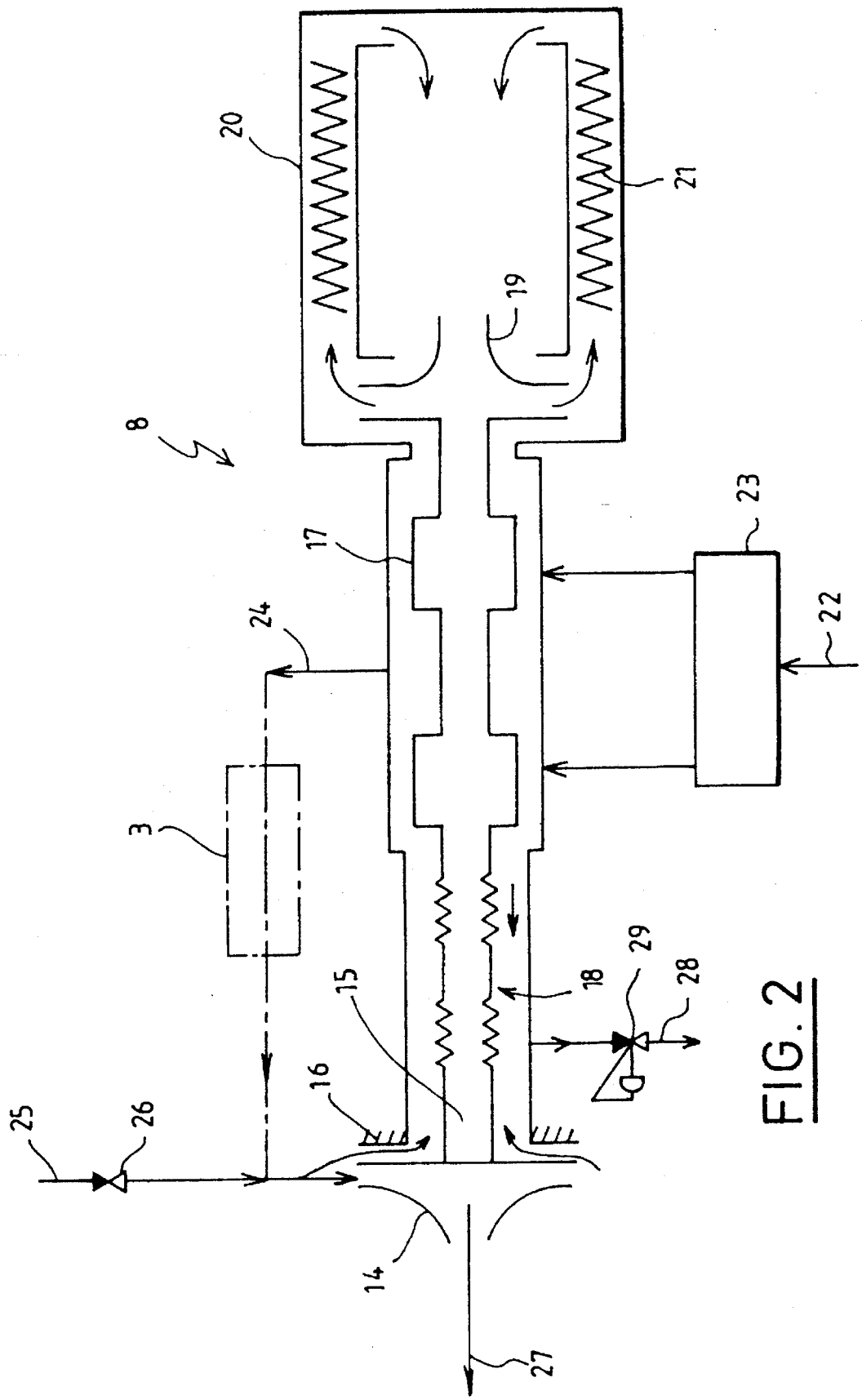
FIG. 2 shows schematically the turbine with gas bearings of this installation.

As schematically shown in FIG. 2, the turbine 8 comprises a rotor 14 connected to a shaft 15 which turns in a stator 16 by means of gas bearings 17. A labyrinthine seal 18 is provided between the rotor and these bearings, and one end of the shaft 15 located beyond the bearings carries a compressor-braked rotor 19. This latter rotates within a casing 20 provided with a refrigerating device 21. The maintenance gas it removed from the conduit 10 via a conduit 22 which opens into a storage chamber 23 maintained at an intermediate pressure of the order of 30 bars.

The expanded support gas leaves the assembly 9 via a conduit 24 after sonic expansion, under a pressure which is adjusted, by suitable means not shown, to an intermediate value comprised between 5 and 15 bars. After cooling from the warm end to the cold end of the heat exchange line 3, this gas is sent to the inlet of the turbine and expanded by this latter to a low pressure of 3 to 4 bars.

If the refrigerating power thus produced is insufficient, the supply of the turbine can be augmented by a flow of purified hydrogen from the separator 7, carried by a conduit 25 provided with an expansion valve 26.

The low pressure hydrogen leaving the turbine is injected via a conduit 27 into the fluid emitted by the expansion valve 11.

As a result, the inlet pressure of the turbine is less than the outlet pressure of the bearings (5 to 15 bars), which is therefore greater than the interstitial pressure $P_i$. So as to avoid an escape of gas at ambient temperature from the bearings toward the cryogenic rotor, there is withdrawn a flow rate of gas from the labyrinthine seal 18 at a pressure $P_i-\epsilon$ slightly less than said interstitial pressure. This withdrawal takes place via a conduit 28 provided with a pressure control valve 29. With the pressure values selected in this example, this pressure is greater than the pressure P1 of the residual gas, and the gas from the control valve 29 can be injected into the residual gas, either, as shown, at the warm end of the heat exchange line, or, in a modification, at the cold end of the heat exchange line, after cooling in this latter.

It will thus be seen that all of the support gas is valorized under three aspects: first, by its expansion in 8, to produce most of the necessary cold; then to reduce the cold temperature by mixture with the methane to be vaporized; then to be used in the "fuel gas" network. Moreover, the quantity of high pressure hydrogen sent to the turbine is reduced strictly to a minimum, which corresponds to maximum output of the process.

If desired, if economical conditions justify it in spite of the low flow rate used, the gas withdrawn from 28 could be cooled in 4 and then in 5, then injected also into the expanded methane in 11.

We claim:

1. In a process for the cryogenic purification of impure hydrogen, which comprises: cooling impure hydrogen under a low pressure PO to a temperature sufficiently low to condense a predetermined proportion of impurities, by heat exchange in a thermal heat exchange line having a warm end and a cold end with purified hydrogen and with a residual fraction containing expanded preliminarily condensed impurities to a low pressure P1, supplying auxiliary cold by the expansion of purified hydrogen in a turbine with gas bearings, and adding the expanded hydrogen to the light impurities expanded at the cold end of the heat exchange line; the improvement wherein the turbine is supplied with the gas leaving its bearings, after cooling of this gas in the heat exchange line, and a leakage flow of hydrogen at a labyrinthine seal of the turbine is withdrawn under a pressure slightly less than an interstitial pressure Pi which prevails between a rotor and a stator of the turbine.

2. A process according to claim 1, wherein the supply of the turbine includes a flow of purified hydrogen in an expansion valve.

3. A process according to claim 1, wherein the leakage flow is added to the residual gas at ambient temperature.

4. A process according to claim 1, wherein the leakage flow is added, after cooling, to said expanded residual fraction.

5. A process according to claim 1, wherein the impure hydrogen is a catalytic reforming gas.

6. A process according to claim 1, wherein the purified hydrogen is used in a hydrotreatment of hydrocarbons.

7. In an installation for the cryogenic purification of impure hydrogen, comprising: a heat exchange line having a warm end and a cold end, at least one phase separator at the cold end of said heat exchange line for separating a liquid phase from a gas phase, a hydrogen expansion turbine having an input, a labyrinthine seal, a rotor, a stator and gas bearings, means for circulating a current of impure hydrogen in one direction in the heat exchange line, means for expanding to a low pressure the liquid phase from the phase separator, means for adding hydrogen under the low pressure to a residual fraction resulting from the expansion, and means to cause to circulate a mixture obtained under the low pressure in countercurrent to the impure hydrogen; the improvement wherein the heat exchange line comprises passages for cooling the gas leaving the bearings of the turbine, said passages being connected to the input of the turbine at the cold end of the heat exchange line and means for withdrawing a leakage flow of hydrogen from the labyrinthine seal of the turbine, under a pressure slightly less than an interstitial pressure Pi which prevails between the rotor and the stator of said turbine.

8. An installation according to claim 7, further comprising conduit means including an expansion valve for connecting the gas phase leaving the phase separator to the input of the turbine.

9. An installation according to claim 7, further comprising an expansion valve for said leakage flow, connected downstream to a conduit for residual gas of the installation, at the warm end of the heat exchange line.

10. An installation according to claim 7, further comprising an expansion valve for said leakage flow, connected downstream, via cooling passages of the heat exchange line, to a conduit which conveys said expanded residual fraction.

11. An installation according to claim 7, connected upstream to an apparatus for catalytic reformation.

12. An installation according to claim 7, whose conduit for producing purified hydrogen is connected, at the warm end of the heat exchange line, to a hydrocarbon hydrodesulfurization apparatus.

* * * * *